(12) United States Patent
Inoue et al.

(10) Patent No.: US 11,458,902 B2
(45) Date of Patent: Oct. 4, 2022

(54) TRAY FOR VEHICLE STORAGE SPACE AND MANUFACTURING METHOD OF TRAY FOR VEHICLE STORAGE SPACE

(71) Applicant: TAKEHIRO CO., LTD., Aichi (JP)

(72) Inventors: Koji Inoue, Anjo (JP); Hisashi Kobayashi, Anjo (JP)

(73) Assignee: TAKEHIRO CO., LTD., Aichi (JP)

( * ) Notice: Subject to any disclaimer, the term of this patent is extended or adjusted under 35 U.S.C. 154(b) by 399 days.

(21) Appl. No.: 16/680,578

(22) Filed: Nov. 12, 2019

(65) Prior Publication Data
US 2020/0148124 A1  May 14, 2020

(30) Foreign Application Priority Data
Nov. 12, 2018 (JP) .............................. JP2018-212306

(51) Int. Cl.
*B60R 5/04* (2006.01)
*B31B 50/20* (2017.01)
*B31D 5/04* (2017.01)

(52) U.S. Cl.
CPC .............. *B60R 5/04* (2013.01); *B31B 50/20* (2017.08); *B31D 5/04* (2013.01)

(58) Field of Classification Search
CPC .......................... B60Q 3/30; B60R 2011/0024
USPC ...................................................... 296/37.5
See application file for complete search history.

(56) References Cited

U.S. PATENT DOCUMENTS

| 6,752,304 | B1 * | 6/2004 | Hotary ................. B60N 2/3093 |
| | | | 224/544 |
| 9,381,865 | B2 * | 7/2016 | Kmita ....................... B60R 5/04 |
| 10,207,648 | B2 * | 2/2019 | Loew ...................... B60R 5/045 |
| 10,336,261 | B2 * | 7/2019 | White ..................... B60R 5/048 |
| 11,104,275 | B2 * | 8/2021 | Ito ............................ B60R 5/045 |
| 2002/0005649 | A1 | 1/2002 | Hofmann et al. |
| 2017/0081072 | A1 | 3/2017 | Dalgleish |

FOREIGN PATENT DOCUMENTS

| GB | 2303356 A | 2/1997 |
| JP | S4943327 U | 4/1974 |
| JP | 2001240042 A | 9/2001 |
| JP | 2003054540 A | 2/2003 |
| JP | 2005219702 A | 8/2005 |
| JP | 2016-88318 A | 5/2016 |

* cited by examiner

*Primary Examiner* — Pinel E Romain
(74) *Attorney, Agent, or Firm* — Brundidge & Stanger, P.C.

(57) ABSTRACT

An object is to expand the capacity of storage of a luggage box and thereby to increase the efficiency of component transportation. A tray for vehicle storage space is formed from a fiber board that includes a bottom portion, side portions and flat portions extended from the side portions and that has a thickness of 2 to 6 mm, a total weight of 450 to 1000 g/m$^2$, and a tensile strength of 850 to 2150 N/25.4 mm. The fiber board has linear first cuts provided on a surface side to divide boundaries between the side portions and the flat portions, linear second cuts provided on a rear face side to divide boundaries between the bottom portion and the side portions, linear third cuts provided on the surface side to fold back the side portions, and linear third cuts provided on the rear face side.

4 Claims, 10 Drawing Sheets

FIG.10

TRAY FOR VEHICLE STORAGE SPACE AND MANUFACTURING METHOD OF TRAY FOR VEHICLE STORAGE SPACE

CROSS REFERENCE TO RELATED APPLICATIONS

The present application claims priority from Japanese patent application 2018-212306 filed on Nov. 12, 2018, the entirety of the content of which is hereby incorporated by reference into this application.

BACKGROUND OF THE INVENTION

Field

The present disclosure relates to a tray for vehicle storage space provided in, for example, behind sheets of a vehicle, such as a motor vehicle.

Related Art

A proposed technique described in JP 2016-88318A provides a luggage space structure of a vehicle that prevents a luggage box made of a resin from being turned over forward without using a clamping member or the like and that improves the assembly of the luggage box to a luggage space.

The luggage box described in JP 2016-88318A is made of a resin. The resin, especially polystyrene foam, is bulky. Accordingly, this decreases the capacity of storage provided in the assembled vehicle. Problems are the difficulty in expanding the capacity of storage space and the low efficiency of component transportation.

The inventors of the present disclosure have intensively examined the structure of the luggage board and have found the material and the configuration of the tray for vehicle storage space that overcome the problems described above.

SUMMARY OF THE INVENTION

A first aspect of the present disclosure provides a tray for vehicle storage space that comprises a fiber board including a bottom portion, side portions, and flat portions extended from the side portions. The fiber board has a thickness of 2 to 6 mm, a total weight of 450 to 1000 g/m$^2$ and a tensile strength of 850 to 2150 N/25.4 mm. The tray for vehicle storage space includes linear first cuts provided in the fiber board to divide boundaries between the flat portions and the side portions, linear second cuts provided to divide boundaries between the bottom portion and the side portions, and linear third cuts provided to fold back the side portions. The tray for vehicle storage space is folded back by using the first cuts, the second cuts and the third cuts to be placed in a vehicle storage space. A method of measuring the tensile strength fixes respective ends in a longitudinal direction of a test piece having a length of 200 mm and a width of 50 mm in a tension testing machine and pulls the test piece at a tension rate of 200 mm/min. A maximum load required for fracture is defined as the tensile strength. When the fiber board has the total weight and the tensile strength that are lower than the respective lower limits, there is a difficulty in retaining the shape of the tray in the assembled state. When the fiber board has the total weight and the tensile strength that are higher than the respective upper limits, on the other hand, there is a difficulty in assembling the fiber board due to the excessive hardness of the fiber board.

Using the fiber board of high rigidity, for example, the fiber board having a slightly higher hardness than an ordinary hardness expands the capacity of storage. The absolute capacity of the space of the luggage room is naturally unchanged. The fiber board, however, has a smaller thickness than the thickness of polystyrene foam. This increases the capacity of the space that allows the user to use. Respective trays are set in an expanded state and are stacked one upon another during transportation. This increases the efficiency of component transportation.

The cuts are formed in the fiber board by a predetermined depth, for example, by a cutting amount of 50 to 70% of the thickness of the fiber board, for example, half the thickness of the fiber board. The fiber board is then folded down along the cutting lines to be formed in a shape along the walls of the luggage room.

The first cuts, the second cuts and the third cuts may have a width of 0.2 to 1.0 mm (i.e., the range of the thickness of a cutter).

A second aspect of the present disclosure provides a manufacturing method of a tray for vehicle storage space. The method comprises a fiber board cutting process of cutting an outer circumference of a fiber board having a total weight of 450 to 1000 g/m$^2$ and a tensile strength of 850 to 2150 N/25.4 mm to have a bottom portion, flat portions and side portions, and a cutting process of providing linear first cuts such as to divide boundaries between the flat portions and the side portions, linear second cuts such as to divide boundaries between the bottom portion and the side portions, and linear third cuts such as to fold back the side portions.

The manufacturing method may further comprises an assembling process of folding down the first cuts and the second cuts and folding back the third cuts to assemble the fiber board in a box-like shape after the cutting process.

An example of the material of the fiber board is a fiber material including a first thermoplastic resin fiber and a second thermoplastic resin fiber. The material of the fiber board may, however, be another material, such as a natural fiber material, a glass fiber material or a material obtained by combining a natural fiber with a thermoplastic resin. The fiber board may have any of various shapes, such as a rectangular shape or a round shape. The tray for vehicle storage space can be manufactured by simply folding down and assembling the fiber board without bonding. The tray for vehicle storage space in the folded down and assembled state can be mounted on the vehicle. The tray for vehicle storage space is placed along walls of a rear storage space of a motor vehicle and is pressed down to be fastened by another component placed on the flat portions.

With regard to the material of the fiber board, for example, the natural fiber is preferably a plant fiber (for example, kenaf fiber), the first thermoplastic resin fiber is preferably a polyester-based resin fiber, and the second thermoplastic resin fiber is preferably a polypropylene-based resin fiber. The thermoplastic resin is preferably a low melting point polyester-based resin, a low melting point polyethylene-based resin or a low melting point polypropylene-based resin.

A plurality of, for example, three third cuts may be provided at each set of folding positions. The leftward or rightward folding direction may be set by controlling which of the three cuts is formed from the surface side and which of the three cuts is formed from the rear face side. This configuration improves the workability. In other words, the crease for folding down may be provided in a desired direction by distribution of the third cuts on the surface side and on the rear face side.

The tray for vehicle storage space according to any of the above aspects of the present disclosure can be placed in a vehicle storage space by simply folding down and assembling the fiber board. This configuration expands the capacity of storage of the tray for vehicle storage space and increases the efficiency of component transportation.

DESCRIPTION OF EMBODIMENTS

Figure 1:
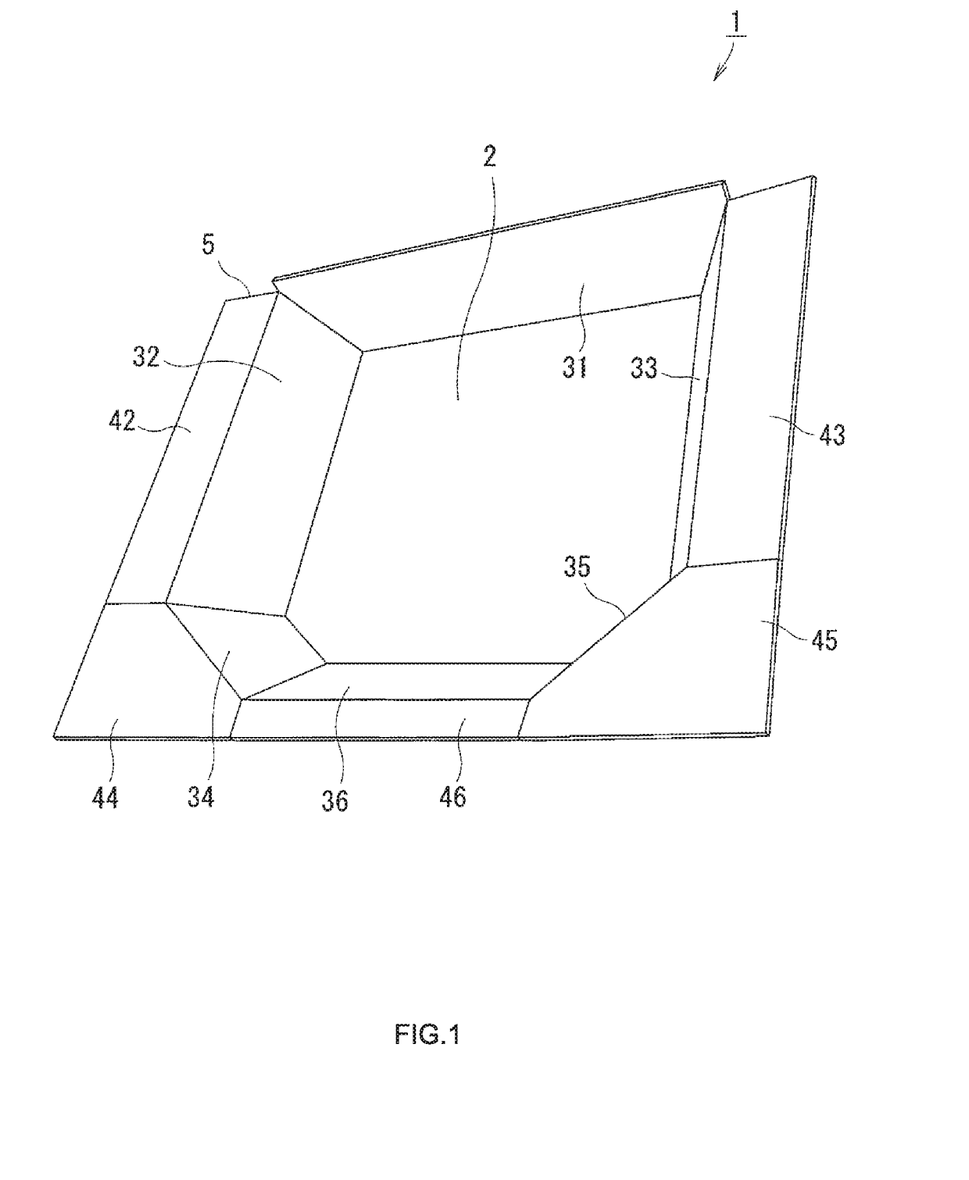
FIG. 1 is a perspective view illustrating a tray for vehicle storage space according to Embodiment 1 of the present disclosure in an assembled state.
Figure 2:
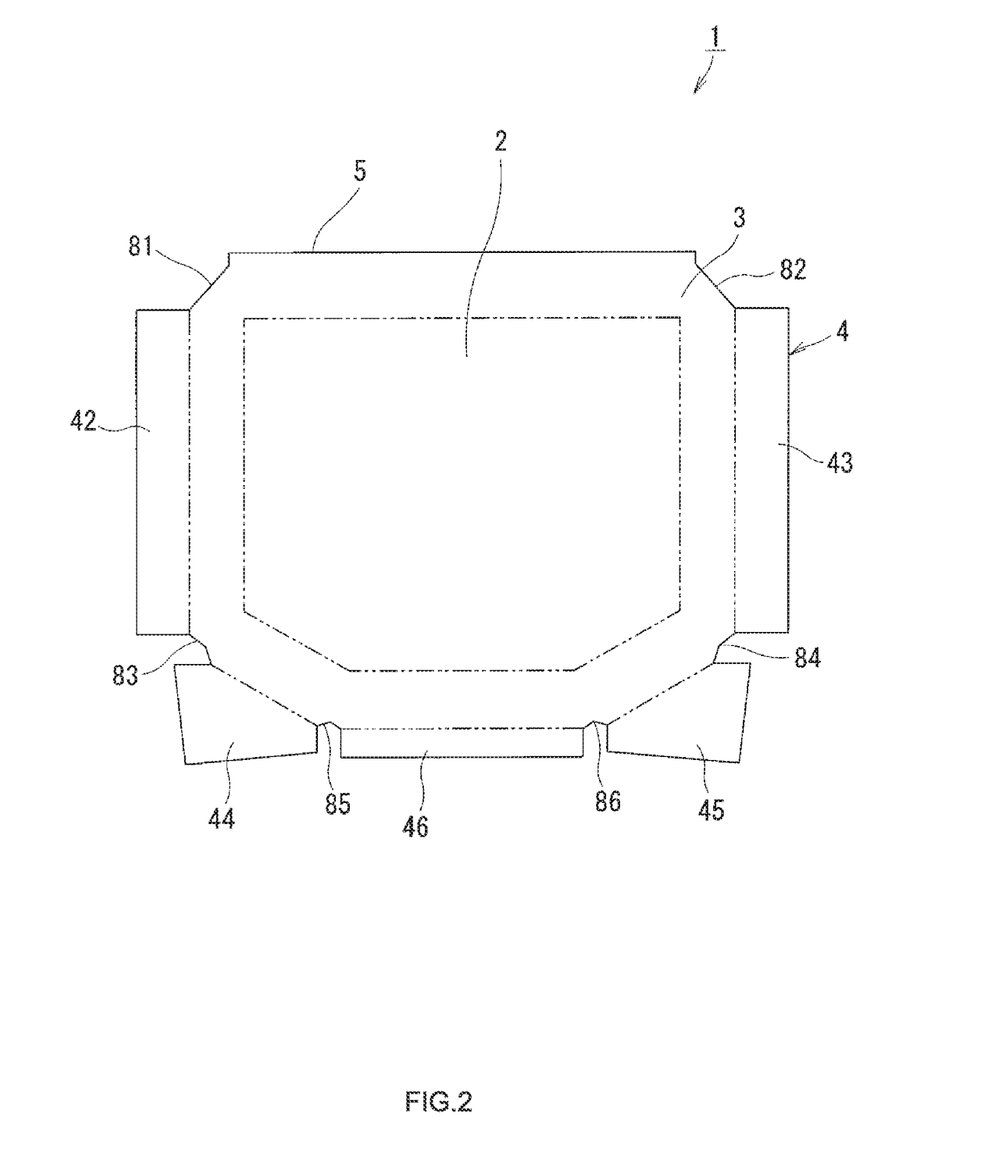
FIG. 2 is a front view illustrating a surface of the tray for vehicle storage space in an expanded state (where two-dot chain lines indicate boundaries between a bottom portion and side portions and between the side portions and flat portions)

A tray for vehicle storage space 1 (hereinafter simply referred to as tray 1) of Embodiment 1 according to the first aspect of the present disclosure is described with reference to FIGS. 1 to 3. As shown in FIG. 1 and FIG. 2, the tray 1 is formed from a fiber board 5 that includes a bottom portion 2, side portions 3 (side pieces 31 to 36) and flat portions 4 (42 to 46) extended from the side portions 3 (from the side pieces 32 to 36) and that has a thickness of 2 to 6 mm, a total weight of 450 to 1000 g/m², and a tensile strength of 850 to 2150 N/25.4 mm. In FIG. 1, solid lines other than solid lines indicating an outer circumference indicate foldable locations of the bottom portion 2, the side portions 3 and the flat portions 4. In FIG. 2, two-dot chain lines indicate boundaries between the bottom portion 2 and the side portions 3 (31 to 36) and between the side portions 3 and the flat portions 4 (42 to 46). More specifically, the tray 1 is formed from one board and is configured, such that the six side portions 3 are respectively connected with six sides of the bottom portion 2 and that the five flat portions 4 are respectively connected with five sides corresponding to the side pieces 32 to 36 out of the six sides of the side portions 3.

Figure 5:
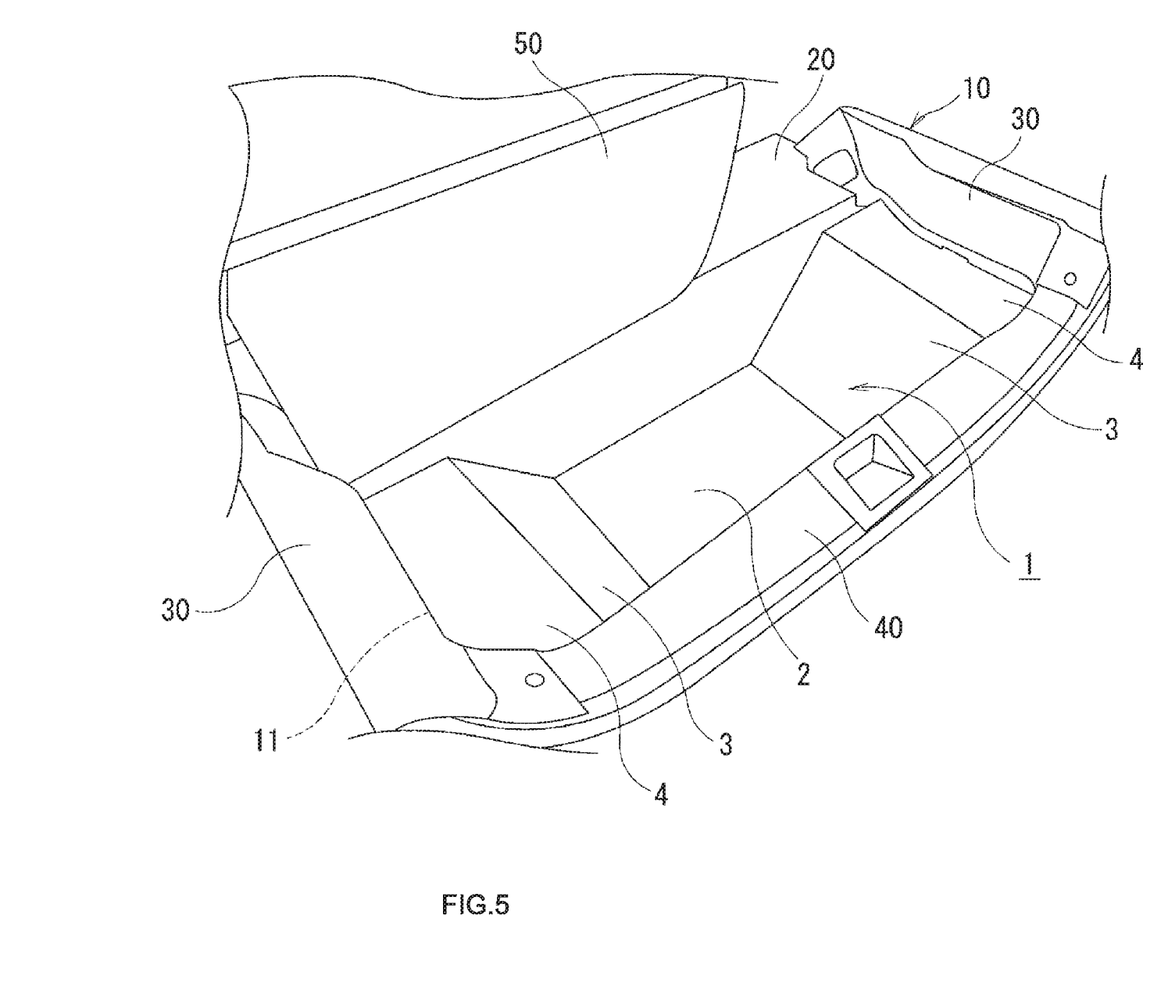
FIG. 5 is a perspective view illustrating the tray for vehicle storage space placed in a rear storage space of a motor vehicle.

The tray 1 is transformable between an expanded state and an assembled state. The tray 1 is formed by simply folding down and assembling the single fiber board 5 without bonding. The tray 1 in the folded down and assembled state may be mounted on the vehicle. As shown in FIG. 5, the tray 1 is placed along walls of a rear storage space 11 of a motor vehicle 10, and respective ends of the flat portions 42 to 46 are vertically held and fixed by a front fixing portion 20, side fixing portions 30 and a rear fixing portion 40. An upper opening of the tray 1 may be opened and closed by a cover 50.

The material of the tray 1 is made of a thermoplastic resin fiber. With regard to the material of the tray 1, for example, the thermoplastic resin fiber is preferably a polyester-based resin fiber, a low melting point polyester-based resin fiber, a low melting point polyethylene-based fiber or a low melting point polypropylene resin fiber.

The tray 1 is a plate like member that includes a polyester fiber and a low melting point polyester fiber as the thermoplastic resin fiber, the total weight of 450 to 1000 g/m² and the thickness of 2 to 6 mm.

According to Embodiment 1, the material used for the tray 1 is a polyester fiber using a low melting point polyester as a binder.

Figure 3:
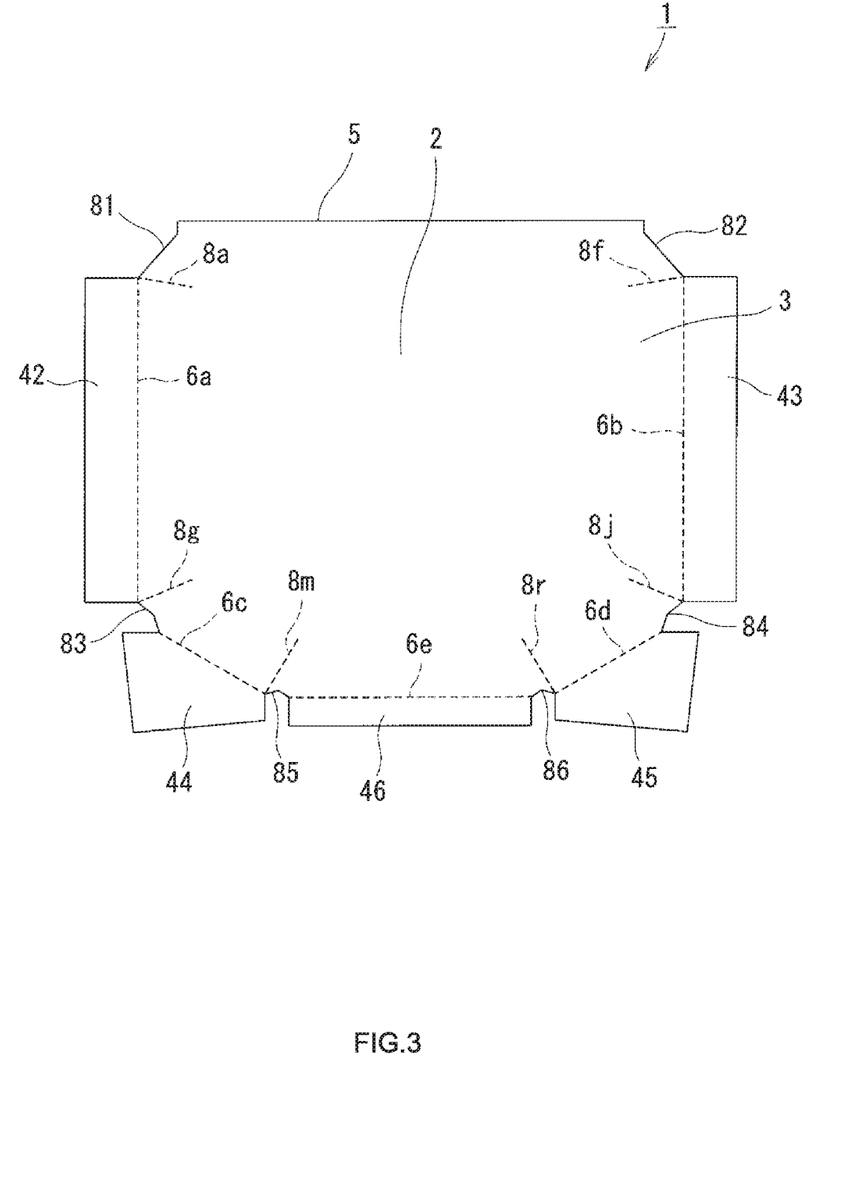
FIG. 3 is a front view illustrating the tray for vehicle storage space in the expanded state (where broken lines indicate the positions of first cuts and third cuts)
Figure 4:
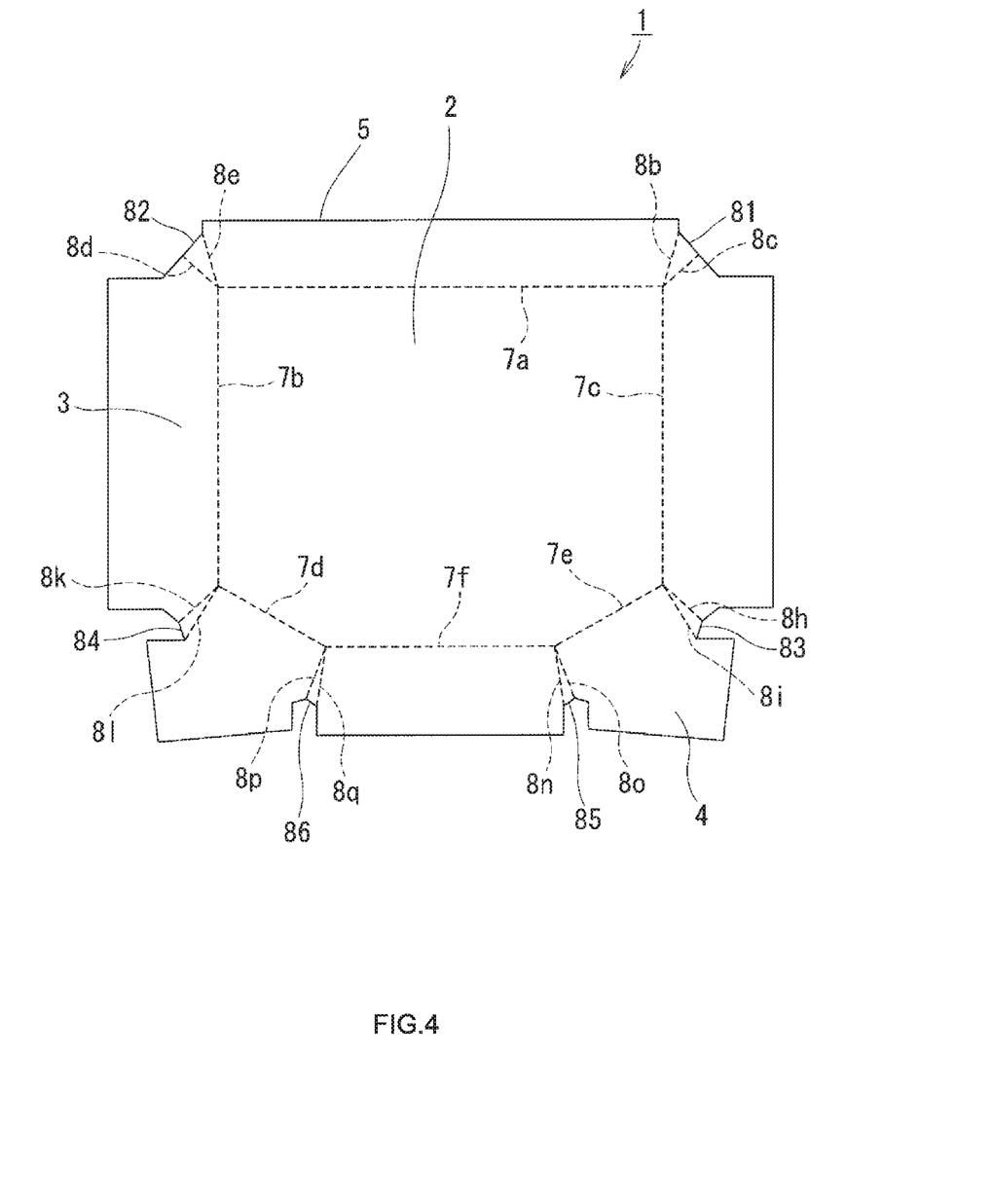
FIG. 4 is a rear view illustrating the tray for vehicle storage space in the expanded state (where broken lines indicate the positions of second cuts and third cuts)

As shown in FIG. 3 and FIG. 4, the single board of the tray 1 in the expanded state has linear first cuts 6a to 6e (shown in FIG. 3) provided on a surface side to divide boundaries between the side portions 3 and the flat portions 4, linear second cuts 7a to 7f (shown in FIG. 4) provided on a rear face side to divide boundaries between the bottom portion 2 and the side portions 3, linear third cuts 8a, 8f, 8g, 8j, 8m and 8r (shown in FIG. 3) provided on the surface side to fold back the side portions 3, and linear third cuts 8b, 8c, 8d, 8e, 8h, 8i, 8k, 8l, 8n, 8o, 8p and 8q provided on the rear face side. The tray 1 is formed in a box-like structure to be placed in the rear storage space 11 of the motor vehicle 10 by folding down the first cuts 6a to 6e and the second cuts 7a to 7f and folding back the third cuts 8a to 8r without performing any additional work such as bonding. The following describes the configuration of the tray 1 more in detail.

As shown in FIG. 1, the bottom portion 2 is formed in an inequilateral hexagonal shape. The side portions 3 form a ring-shaped band like structure and are placed to surround the bottom portion 2.

The side portions 3 constitute side walls. As shown in FIGS. 1 to 4, the side portions 3 include a plurality of the side pieces 31 to 36. The side piece 31 is provided in a middle part of an upper side of the bottom portion 2. The side piece 32 is provided on a left side of the bottom portion 2. The side piece 33 is provided on a right side of the bottom portion 2. The side piece 34 is provided on a lower left corner of the bottom portion 2. The side piece 35 is provided on a lower right corner of the bottom portion 2. The side piece 36 is provided on a lower side of the bottom portion 2.

As shown in FIG. 1, the flat portions 4 include a rectangular first flat portion 42 that connects with a left side of the side piece 32, a rectangular second flat portion 43 that connects with a right side of the side piece 33, a pentagonal third flat portion 44 that connects with a lower side of the side piece 34, a pentagonal fourth flat portion 45 that connects with a lower side of the side piece 35, and a rectangular fifth flat portion 46 that connects with a lower side of the side piece 36.

The configuration and the arrangement of the linear first cuts 6a to 6e, the linear second cuts 7a to 7f and the third cuts 8a to 8r on the surface of the tray 1 are described with reference to FIG. 3 and FIG. 4 that show the tray 1 in the expanded state.

As shown in FIG. 1 and FIG. 3, the first cut 6a, the first cut 6b, the first cut 6c, the first cut 6d and the first cut 6e are configured to respectively separate the flat portion 42, the flat portion 43, the flat portion 44, the flat portion 45 and the flat portion 46 from the side pieces 32 to 36.

As shown in FIG. 1 and FIG. 4, the second cut 7a, the second cut 7b, the second cut 7c, the second cut 7d, the second cut 7e, and the second cut 7f are configured to respectively separate the side piece 31, the side piece 33, the side piece 32, the side piece 35, the side piece 34 and the side piece 36 from the bottom portion 2. The second cuts 7a to 7f are arranged in a hexagonal ring shape. The second cuts 7d and 7e are arranged to be bilaterally symmetrical.

The third cuts 8a to 8c, the third cuts 8d to 8f, the third cuts 8g to 8i, the third cuts 8j to 8l, the third cuts 8m to 8o and the third cuts 8p to 8r are respectively arranged in threes to be in triangular shapes and form parts for folding back the side portions 3. In the front view of FIG. 3 and the rear view of FIG. 4, the left side and the right side are inverted, so that the reference signs indicating each set of three should also be inverted to be in combination.

As shown in FIG. 3, the third cut 8a is extended to be slanted inward from an intersection between an upper side 81 and the first cut 6a. The third cut 8f is extended to be slanted inward from an intersection between an upper side 82 and the first cut 6b. The third cut 8g is extended to be slanted inward from an intersection between an upper side 83 and the first cut 6a. The third cut 8j is extended to be slanted inward from an intersection between an upper side 84 and the first cut 6b. The third cut 8m is extended to be slanted inward from an upper side 85 and the first cut 6c. The third cut 8r is extended to be slanted inward from an intersection between an upper side 86 and the first cut 6d.

As shown in FIG. 4, the third cuts 8d and 8e are extended from an intersection between the second cuts 7a and 7b. The third cuts 8b and 8c are extended from an intersection between the second cuts 7a and 7c. The third cuts 8k and 8l are extended from an intersection between the second cuts 7b and 7d. The third cuts 8h and 8i are extended from an intersection between the second cuts 7c and 7e. The third cuts 8p and 8q are extended from an intersection between the second cuts 7d and 7f. The third cuts 8n and 8o are extended from an intersection between the second cuts 7f and 7e.

The respective upper sides 81 to 86 of the triangles described above are formed in the respective sets of three. The upper sides 81 and 82 are straight lines. The upper sides 83 to 86 are folded lines that are convex downward. In each set of three described above, one third cut is provided on one face (surface side), and the other two third cuts are provided on the other face (rear side). When the tray 1 is transformed from the expanded state to the assembled state, the third cuts 8a to 8r are deformed in respective directions of opening up the respective cuts.

The depths of the first cuts 6, the second cuts 7 and the third cuts 8 are 50 to 70% of the thickness of the fiber board 5.

The widths of the first cuts 6, the second cuts 7 and the third cuts 8 are 0.2 to 1.0 mm (i.e., the thickness of a cutter).

The following describes a manufacturing method of the tray for vehicle storage space of the embodiment according to the second aspect of the present disclosure.

The manufacturing method manufactures the fiber board 5 having a total weight of 450 to 1000 g/m$^2$ and a tensile strength of 850 to 2150 N/25.4 mm and subsequently performs a fiber board cutting process of cutting the outer circumference of the fiber board 5 to form the side pieces 31 to 36, the flat portions 42 to 46, and the upper sides 81 to 86. When the fiber board 5 has the total weight and the tensile strength that are lower than the respective lower limits, there is a difficulty in retaining the shape of the tray in the assembled state. When the fiber board 5 has the total weight and the tensile strength that are higher than the respective upper limits, on the other hand, there is a difficulty in assembling the fiber board 5 due to the excessive hardness of the fiber board 5.

The manufacturing method subsequently performs a cutting process of providing the linear first cuts 6a to 6e such as to divide the boundaries between the flat portions 42 to 46 and the side pieces 32 to 36, the linear second cuts 7a to 7f such as to divide the boundaries between the bottom portion 2 and the side pieces 31 to 36, and the linear third cuts 8a to 8r such as to fold down the side pieces 31 to 36.

After the cutting process described above, the manufacturing method performs an assembling process of folding down the first cuts 6a to 6e and the second cuts 7a to 7f and pinching and folding back the respective triangles surrounded by the third cuts 8a to 8r and the upper sides 81 to 86 to assemble the fiber board 5 in a box-like shape.

The following describes the advantageous effects of the above embodiment according to the first aspect and the second aspect of the present disclosure.

The fiber board 5 has a smaller thickness than the thickness of polystyrene foam. This increases the capacity of the space that allows the user to use. Respective fiber boards are set in the expanded state and are stacked one upon another during transportation. This increases the efficiency of component transportation.

Figure 6:
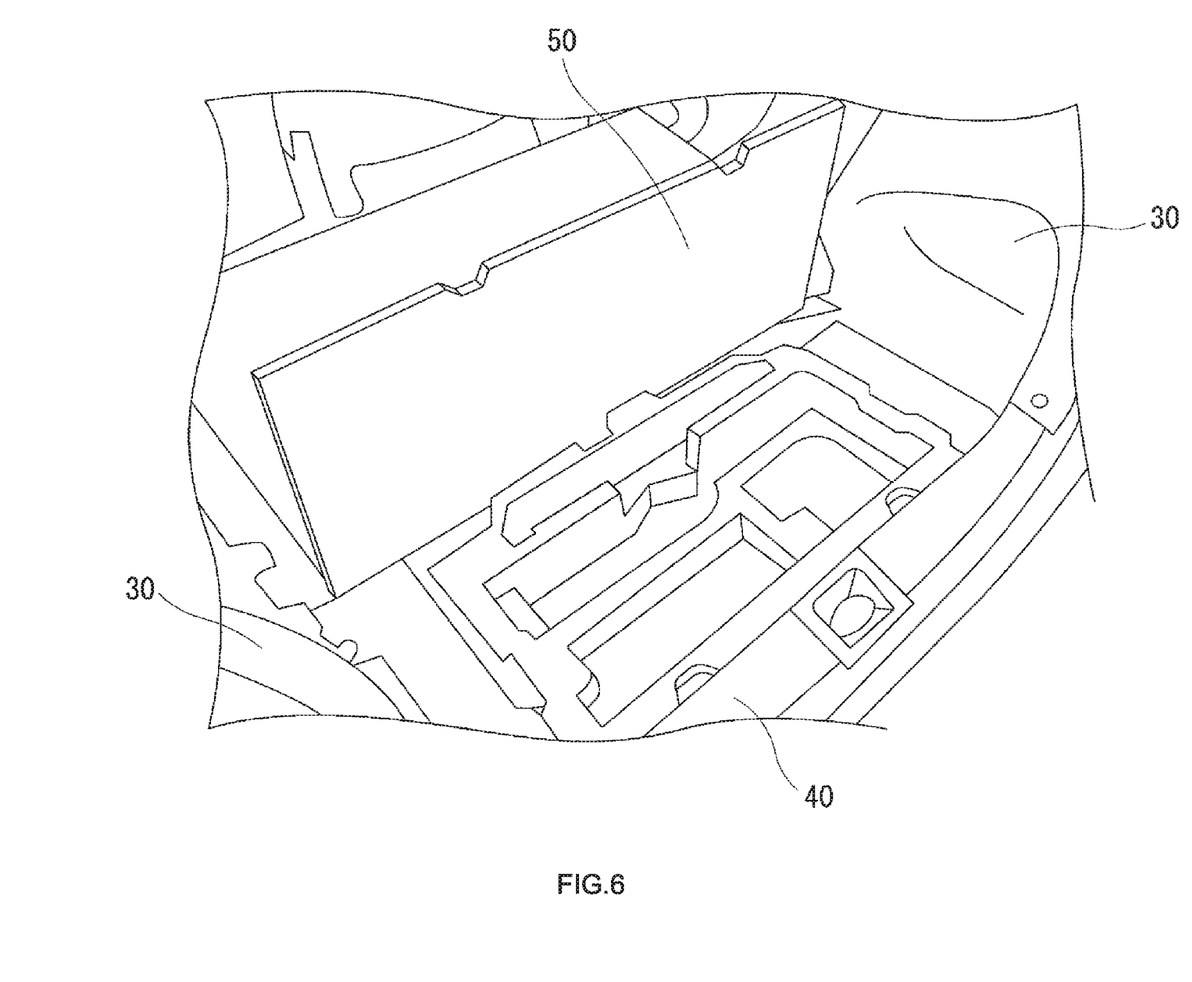
FIG. 6 is a perspective view illustrating a tray for vehicle storage place according to a comparative example placed in the rear storage space.
Figure 7:
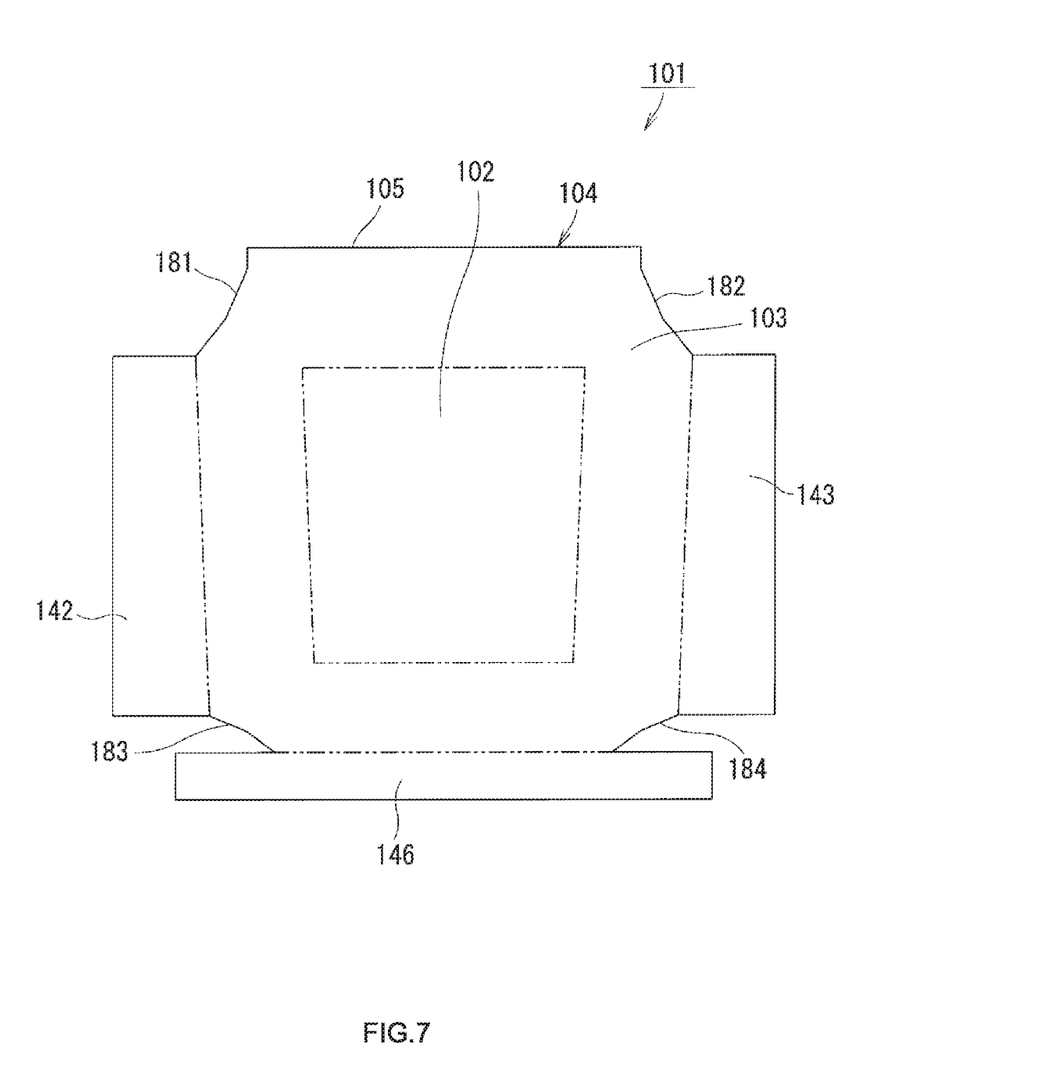
FIG. 7 is a front view illustrating a tray for vehicle storage space according to Embodiment 2 of the present disclosure in an expanded state (where two-dot chain lines indicate boundaries between a bottom portion and side portions and between the side portions and flat portions)
Figure 8:
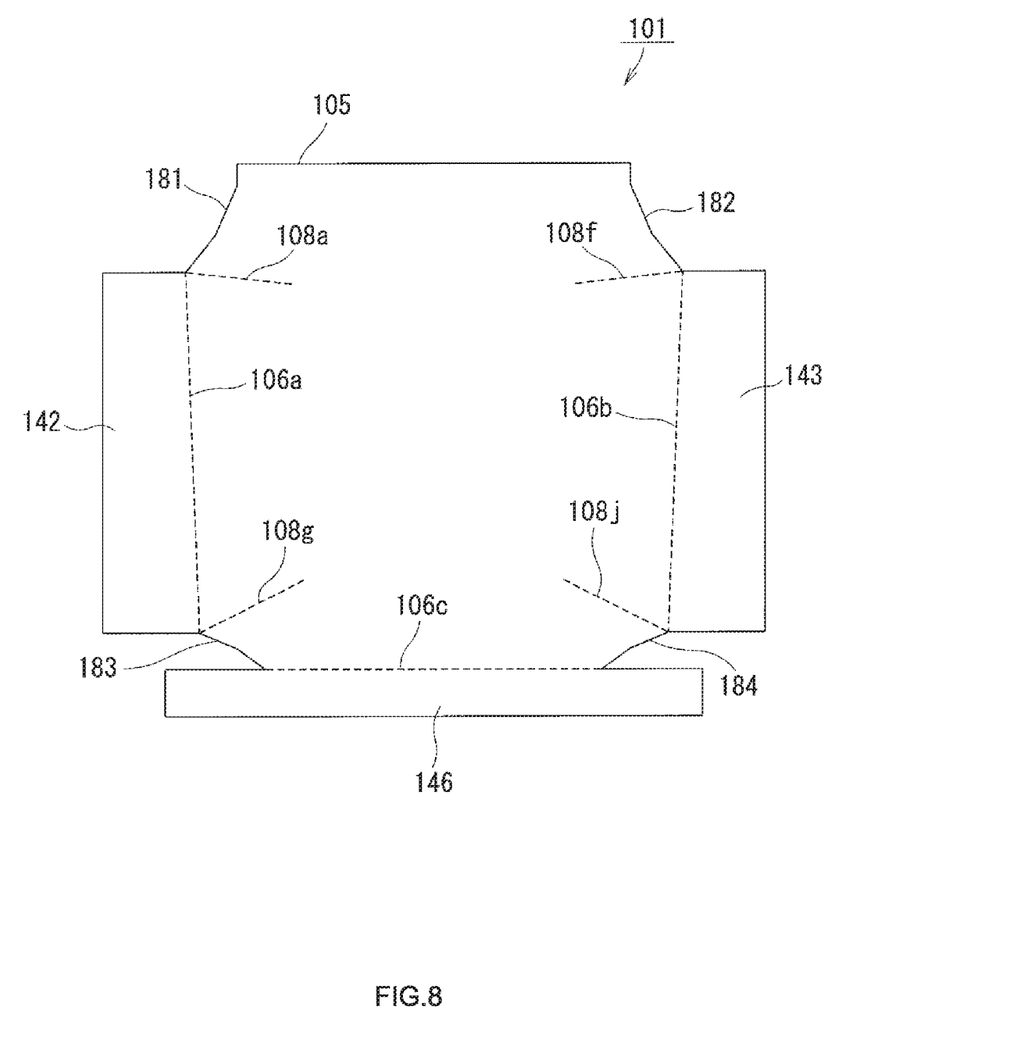
FIG. 8 is a front view illustrating the tray for vehicle storage space in the expanded state (where broken lines indicate the positions of first cuts and third cuts)
Figure 9:
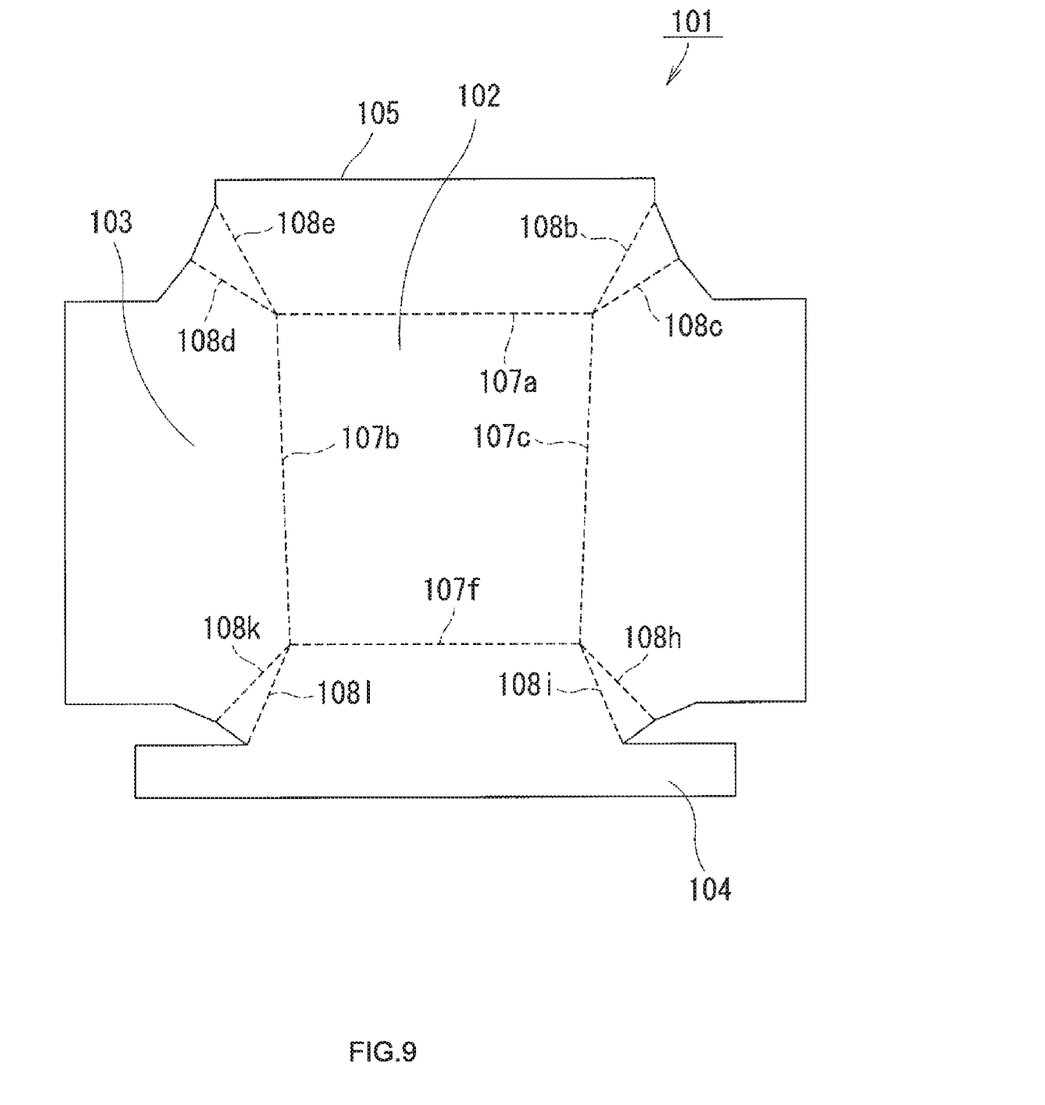
FIG. 9 is a rear view illustrating the tray for vehicle storage space in the expanded state (where broken lines indicate the positions of second cuts and third cuts)
Figure 10:
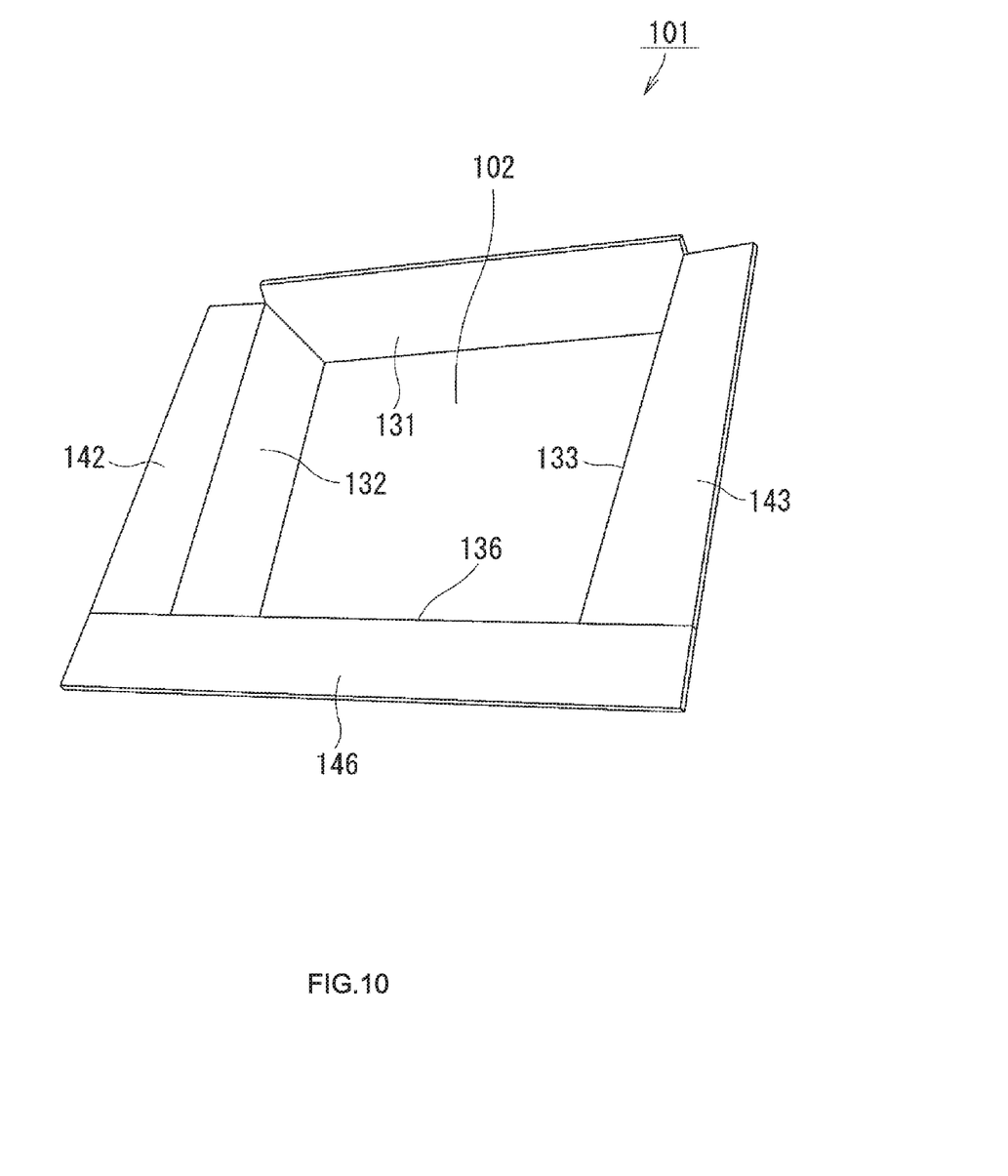
FIG. 10 is a perspective view illustrating the tray for vehicle storage space in an assembled state.

For example, for the purpose of weight reduction, a tool box made of polystyrene foam may be provided to place tools such as a jack therein according to a comparative example shown in FIG. 6. The tray according to the embodiment of the present disclosure increases the capacity of the space, compared with such a tool box made of polystyrene foam.

Using the fiber board 5 having high rigidity provides the sufficient load capacity.

The crease for folding down may be controlled by determining which of the third cuts 8a to 8r is formed from the surface side or formed from the rear face side.

The following describes Example 1 for the purpose of illustrating the aspects of the present disclosure more specifically. The present disclosure is, however, not limited to the description of this example.

Example 1

A tray 1 of Example 1 is described. Prior to assembly, the tray 1 was comprised of polyethylene terephthalate fiber and low melting point polyethylene terephthalate fiber and had a total weight of 800 g/m$^2$, a thickness of 3 mm and dimensions of 85.5 cm as a vertical maximum length and 102 cm as a lateral maximum length.

The tensile strength of the above tray 1 was measured by a procedure given below. The procedure fixed respective ends in a longitudinal direction of a test piece of the tray 1 having a length of 150 mm and a width of 100 mm in a tension testing machine. The area of the test piece to be fixed was 25.4 mm×25.4 mm. When fixation parts of the respective ends are respectively expressed as a fixation part A and a fixation part B, a distance between the fixation part A and the fixation part B was 76.2 mm. The procedure measured a load in tensile fracture at a tension rate of 200 mm/min. The measured load of tensile strength was 1790 N/25.4 mm.

The following describes a tray for vehicle storage space 101 (hereinafter simply referred to as tray 101) according to Embodiment 2 of the present disclosure with reference to FIGS. 7 to 10. This tray 101 is substantially similar to the tray 1 with some differences. The tray 101 of Embodiment 2 has a rectangular bottom portion 102 and includes different numbers and shapes of side portions 103 and flat portions 104. Like components of Embodiment 2 to the components of Embodiment 1 are expressed by like reference symbols in 100s.

INDUSTRIAL APPLICABILITY

The tray for vehicle storage space according to the present disclosure is applicable for deck boards and luggage trims of vehicles, especially mini motor vehicles and small motor vehicles.

The present disclosure is not limited to the embodiments described above but may be implemented by various other aspects in the technical scope of the present disclosure. Various modifications and variations may be made to the embodiments without departing from the technical scope of the present disclosure. Such modifications and variations, as well as their equivalents are also included in the technical scope of the present disclosure. For example, the shape, the configuration, the dimensions, the material and the like of the fiber board 5 are not limited to those described in the above embodiments but may be changed or modified appropriately. The tray for vehicle storage space according to the present disclosure may be employed for, for example, vehicle interior components, tool boxes, and deck trays and may be applied for sedan vehicles, coupe vehicles, hatchback vehicles, and wagon vehicles as types of motor vehicles.

What is claimed is:

1. A tray for vehicle storage space, comprising:
   a fiber board that includes a bottom portion, side portions, and flat portions extended from the side portions and has a thickness of 2 to 6 mm, a total weight of 450 to 1000 g/m² and a tensile strength of 850 to 2150 N/25.4 mm;
   linear first cuts provided in the fiber board to divide boundaries between the flat portions and the side portions;
   linear second cuts provided in the fiber board to divide boundaries between the bottom portion and the side portions; and
   linear third cuts provided in the fiber board to fold back the side portions,
   the tray for vehicle storage space being folded back and assembled in box-like shape by using the first cuts, the second cuts and the third cuts to be placed in a vehicle storage space, wherein the flat portions are extended from the side portions to a direction opposite to the bottom portion in an assembled state and the flat portions is for being fixed by the fixing portion of a vehicle.

2. The tray for vehicle storage space according to claim 1, wherein the first cuts, the second cuts and the third cuts have a depth that is 50 to 70% of the thickness of the fiber board.

3. The tray for vehicle storage space according to claim 1, wherein the first cuts, the second cuts and the third cuts have a width of 0.2 to 1.0 mm.

4. A manufacturing method of a tray for vehicle storage space, comprising:
   a fiber board cutting process of cutting an outer circumference of a fiber board having a total weight of 450 to 1000 g/m² and a tensile strength of 850 to 2150 N/25.4 mm to have a bottom portion, flat portions and side portions;
   a cutting process of providing linear first cuts such as to divide boundaries between the flat portions and the side portions, linear second cuts to divide boundaries between the bottom portion and the side portions, and linear third cuts such as to fold back the side portions; and
   an assembling process of folding down the first cuts and the second cuts and folding back the third cuts to assemble the fiber board in a box-like shape, such that the flat portions are extended from the side portions to a direction opposite to the bottom portion, wherein the flat portions is for being fixed by a fixing portion of a vehicle.

* * * * *